United States Patent
El-Zehiry et al.

(10) Patent No.: US 11,227,386 B2
(45) Date of Patent: Jan. 18, 2022

(54) IDENTIFYING THE QUALITY OF THE CELL IMAGES ACQUIRED WITH DIGITAL HOLOGRAPHIC MICROSCOPY USING CONVOLUTIONAL NEURAL NETWORKS

(71) Applicant: Siemens Healthcare GmbH, Erlangen (DE)

(72) Inventors: Noha Youssry El-Zehiry, Plainsboro, NJ (US); Saikiran Rapaka, Pennington, NJ (US); Ali Kamen, Skillman, NJ (US)

(73) Assignee: Siemens Healthcare GmbH, Erlangen (DE)

(*) Notice: Subject to any disclaimer, the term of this patent is extended or adjusted under 35 U.S.C. 154(b) by 25 days.

(21) Appl. No.: 16/617,162

(22) PCT Filed: Jul. 6, 2018

(86) PCT No.: PCT/EP2018/068345
§ 371 (c)(1),
(2) Date: Nov. 26, 2019

(87) PCT Pub. No.: WO2019/034328
PCT Pub. Date: Feb. 21, 2019

(65) Prior Publication Data
US 2020/0184637 A1 Jun. 11, 2020

Related U.S. Application Data

(60) Provisional application No. 62/545,517, filed on Aug. 15, 2017.

(51) Int. Cl.
*G06T 7/00* (2017.01)
*G06T 7/187* (2017.01)
(Continued)

(52) U.S. Cl.
CPC .......... *G06T 7/0012* (2013.01); *G02B 21/244* (2013.01); *G02B 21/367* (2013.01);
(Continued)

(58) Field of Classification Search
CPC ....... G06T 7/0012; G06T 7/187; G06T 7/136; G06T 2207/10056; G06T 2207/20081;
(Continued)

(56) References Cited

U.S. PATENT DOCUMENTS 4,998,284 A * 3/1991 Bacus ................ G01N 15/1468
348/176
5,655,028 A * 8/1997 Soll .......................... G06T 7/246
382/100
(Continued)

FOREIGN PATENT DOCUMENTS

| CN | 102007369 A | 4/2011 |
| CN | 102411715 A | 4/2012 |
(Continued)

OTHER PUBLICATIONS

Office Action and Search Report dated May 8, 2021 in corresponding Chinese Patent Application No. 201880052840.9.
(Continued)

*Primary Examiner* — Manav Seth

(57) ABSTRACT

A system for performing adaptive focusing of a microscopy device comprises a microscopy device configured to acquire microscopy images depicting cells and one or more processors executing instructions for performing a method that includes extracting pixels from the microscopy images. Each set of pixels corresponds to an independent cell. The method further includes using a trained classifier to assign one of a plurality of image quality labels to each set of pixels indicating the degree to which the independent cell is in focus. If the image quality labels corresponding to the sets
(Continued)

of pixels indicate that the cells are out of focus, a focal length adjustment for adjusting focus of the microscopy device is determined using a trained machine learning model. Then, executable instructions are sent to the microscopy device to perform the focal length adjustment.

9 Claims, 11 Drawing Sheets

(51) Int. Cl.
| | |
|---|---|
| G06T 7/136 | (2017.01) |
| G02B 21/24 | (2006.01) |
| G02B 21/36 | (2006.01) |
| G03H 1/00 | (2006.01) |
| G06K 9/00 | (2006.01) |
| G06K 9/46 | (2006.01) |
| G06K 9/54 | (2006.01) |
| G06K 9/62 | (2006.01) |

(52) U.S. Cl.
CPC ......... *G03H 1/0005* (2013.01); *G06K 9/0014* (2013.01); *G06K 9/00147* (2013.01); *G06K 9/46* (2013.01); *G06K 9/54* (2013.01); *G06K 9/628* (2013.01); *G06K 9/6256* (2013.01); *G06T 7/136* (2017.01); *G06T 7/187* (2017.01); *G03H 2001/005* (2013.01); *G06T 2207/10056* (2013.01); *G06T 2207/20081* (2013.01); *G06T 2207/20132* (2013.01); *G06T 2207/20216* (2013.01); *G06T 2207/20224* (2013.01); *G06T 2207/30024* (2013.01); *G06T 2207/30168* (2013.01)

(58) Field of Classification Search
CPC . G06T 2207/20132; G06T 2207/20216; G06T 2207/20224; G06T 2207/30024; G06T 2207/30168; G02B 21/244; G02B 21/367; G03H 1/0005; G03H 2001/005; G06K 9/0014; G06K 9/00147; G06K 9/46; G06K 9/54; G06K 9/6256; G06K 9/628
See application file for complete search history.

(56) References Cited

U.S. PATENT DOCUMENTS

| | | | | |
|---|---|---|---|---|
| 5,875,258 | A * | 2/1999 | Ortyn | G01N 35/00594 382/133 |
| 7,034,883 | B1 | 4/2006 | Rosenqvist | |
| 7,760,927 | B2 * | 7/2010 | Gholap | G06K 9/00127 382/133 |
| 7,761,250 | B2 * | 7/2010 | Tian | G01B 21/042 702/82 |
| 7,963,906 | B2 * | 6/2011 | Wong | G01N 33/5005 |
| 8,049,811 | B2 * | 11/2011 | Gamadia | H04N 5/232123 348/345 |
| 8,143,600 | B2 | 3/2012 | Seibel et al. | |
| 8,224,058 | B2 * | 7/2012 | Lindberg | G01N 15/1463 382/133 |
| 8,323,177 | B2 * | 12/2012 | Wong | A61B 17/435 600/34 |
| 8,326,029 | B1 * | 12/2012 | Obrador | G06F 16/5838 382/164 |
| 8,472,679 | B2 * | 6/2013 | Abiko | G06K 9/036 382/115 |
| 8,503,801 | B2 * | 8/2013 | Schiller | G06K 9/40 382/228 |
| 8,721,521 | B2 * | 5/2014 | Wong | C12M 21/06 600/33 |
| 8,744,164 | B2 * | 6/2014 | Ozinsky | G01N 21/6458 382/133 |
| 8,885,941 | B2 * | 11/2014 | Schiller | G06T 5/003 382/180 |
| 8,902,328 | B2 * | 12/2014 | Vidal-Naquet | G06T 7/00 348/222.1 |
| 9,524,450 | B2 | 12/2016 | Ravindran et al. | |
| 9,836,839 | B2 * | 12/2017 | Champlin | G06K 9/00147 |
| 9,927,604 | B2 * | 3/2018 | Uyar | G06K 9/00127 |
| 10,109,052 | B2 | 10/2018 | Chefd'hotel et al. | |
| 10,460,231 | B2 | 10/2019 | Zhang et al. | |
| 2003/0143524 | A1 | 7/2003 | Lerner | |
| 2006/0178833 | A1 | 8/2006 | Bauer et al. | |
| 2012/0258547 | A1 | 10/2012 | Von Drasek et al. | |
| 2014/0127716 | A1 | 5/2014 | Longo et al. | |

FOREIGN PATENT DOCUMENTS

| | | |
|---|---|---|
| CN | 102625932 A | 8/2012 |
| CN | 105938559 A | 9/2016 |
| CN | 106934426 A | 7/2017 |
| EP | 1210634 B1 | 10/2010 |
| JP | H09311102 A | 12/1997 |
| JP | 2017516992 A | 6/2017 |
| WO | 2015195609 | 12/2015 |
| WO | 2017050861 A1 | 3/2017 |
| WO | 2017157555 | 9/2017 |

OTHER PUBLICATIONS

International Search Report dated Nov. 16, 2018 in corresponding International Patent Application No. PCT/EP2018/068345.
Yang, et al: "Assessing microscope image focus quality with deep learning", BMC Bioinformatics, Biomed Central Ltd, London, UK, vol. 19, No. 1, Mar. 15, 2018 (Mar. 15, 2018); pp. 1-9.
Zeder, et al: "Automated quality assessment of autonomously acquired microscopic images of fluorescently stained bacteria", Cytometry. Part A, John Wiley & Sons, Inc, US, vol. 77. No. 1, Jan. 1, 2010 (Jan. 1, 2010), .pp. 76-85.
Matula, et al: "Single-cell-based image analysis of high-throughput cell array screens for quantification of viral infection"; Cytometry Part A, vol. 75A, No. 4, Apr. 1, 2009 (Apr. 1, 2009); , pp. 309-318.
Zeder, et al: "Multispot live-image autofocusing for high-throughput microscopy of fluorescently stained bacteria", NIH Public Access Author Manuscript, vo 1 . 7 5A, No. 9, Sep. 1, 2009 (Sep. 1, 2009), pp. 781-788.
Office Action dated Sep. 15, 2021 in corresponding European patent application No. 18748860.6.
Anonymous: "Convolutional neural network—Wikipedia"; Aug. 17, 2016 (Aug. 17, 2016), XP055697578; Retrieved from the Internet: URL: https://en.wikipedia.org/w/index.php?title=Convolutional_neutral_network&oldid=734940910; (Retrieved on May 20, 2020).
Pitkäaho, Tomi et al: "Preformance of Autofocus Capability of Deep Convolutional Neutral Networks in Digital Holographic Microscopy"; Digital Holography and Three-Dimensional Imaging; Jan. 1, 2016 (Jan. 1, 2016), p. W2A.5.
Han, Liang et al: "Transferring Microscopy Image Modalities with Conditional Generative Adversarial Networks"; 2017 IEEE Conference on Computer Vision and Pattern Recognition Workshops (CVPRW), USA; IEEE; Jul. 21, 2017; pp. 851-859.
Office Action dated Nov. 2, 2021 in corresponding Japanese patent application No. 2020-508555.

* cited by examiner

|  | Total Number of Cells | Number of Cells used for Training | Number of Cells used for Testing | Classification Accuracy |
|---|---|---|---|---|
| Good quality (in focus) images | 50613 | 30000 | 20613 | 85.43% |
| Poor quality (out of Focus) | 38935 | 30000 | 8935 | 83.12% |
| Overall | 89548 | 60000 | 29548 | 84.73% |

*Fig. 7*

IDENTIFYING THE QUALITY OF THE CELL IMAGES ACQUIRED WITH DIGITAL HOLOGRAPHIC MICROSCOPY USING CONVOLUTIONAL NEURAL NETWORKS

CROSS REFERENCE TO RELATED APPLICATIONS

This application is a national phase filing under 35 U.S.C. § 371 of International Patent Application No. PCT/EP2018/068345, filed Jul. 6, 2018, which is incorporated herein by reference in its entirety.

This application claims the benefit of U.S. Provisional Application Ser. No. 62/545,517 filed Aug. 15, 2017, which is incorporated herein by reference in its entirety.

TECHNICAL FIELD

The present disclosure relates generally to using convolutional neural networks (CNN) to identify the quality of image acquired using digital holographic microscopy (DHM) and other microscopy techniques. The various systems, methods, and apparatuses described herein may be applied to, for example, enhance classification workflows and the subsequent diagnosis decisions by removing out of focus or poor quality images from analysis.

BACKGROUND

Digital holographic microscopy (DHM), also known as interference phase microscopy, is an imaging technology that provides the ability to quantitatively track sub-nanometric optical thickness changes in transparent specimens. Unlike traditional digital microscopy, in which only intensity (amplitude) information about a specimen is captured, DHM captures both phase and intensity. The phase information, captured as a hologram, can be used to reconstruct extended morphological information (such as depth and surface characteristics) about the specimen using a computer algorithm. Modern DHM implementations offer several additional benefits, such as fast scanning/data acquisition speed, low noise, high resolution and the potential for label-free sample acquisition.

DHM is particularly well suited for acquiring images of blood cells for classification purposes, or to perform subsequent diagnosis decisions. For example, one of the important features of a complete blood count is to classify the white blood cells (WBC) into five different categories as the imbalance of the number of cells in one or more category helps in disease diagnosis. Automatic classification of the WBC can be performed by applying advanced image analysis techniques on the cell images acquired using DHM. The quality of the cell image is crucial and would affect the accuracy of the classification. Therefore, it is important to be able to identify good quality cell images.

Off-axis holographic microcopy system creates holograms where there is a modulating pattern over the entire field of view due to a small angle between object and reference beam. Furthermore, as depicted in the specific DHM set up shown in FIG. 1, the reference beam is created from the object beam using two lenses and a pinhole to erase the object spatial signature and to provide a uniform plane waves for creating an interference or hologram image. The focal length would greatly affect the quality of the acquired cell images. The distance between the focal plane and the object impacts the appearance of the phase images and their quality. FIG. 2 illustrates example cell images with different quality. In the top row, the cells are in focus and the information content of the image can be used to discriminate among the different cell types. The images in the bottom row are of cells that are out of focus and distorted. The image quality is very poor and cannot be used in a diagnosis workflow.

SUMMARY

Embodiments of the present invention address and overcome one or more of the above shortcomings and drawbacks, by providing methods, systems, and apparatuses related to identifying the quality of the cell images acquired with a microscopy device using a convolutional neural network (CNN). Briefly, a CNN is trained to determine whether cells are in focus or out of focus in an acquired image. In some embodiments, based on this determination, instructions may be provided to the microscopy device to adjust the focal length so as to bring the acquired images into focus.

According to some embodiments, a computer-implemented method for detecting out of focus microscopy images includes acquiring microscopy images depicting cells, and extracting one or more sets of pixels from the microscopy images. Each set of pixels corresponds to an independent cell. One of a plurality of image quality labels are assigned to each set of pixels indicating the degree to which the independent cell is in focus. A classifier is trained to classify the set of pixels into the image quality labels. The classifier is configured according to a multi-layer architecture and the training results in determination of weights for connecting layers in the multi-layer architecture. A deployment of the classifier is created based on the multi-layer architecture, the weights, and the image quality labels.

According to other embodiments, a computer-implemented method for performing adaptive focusing of a microscopy device includes acquiring a plurality of microscopy images depicting cells using a microscopy device, and extracting one or more sets of pixels from the microscopy images. Each set of pixels corresponds to an independent cell. Then, a trained classifier is used to assign one of a plurality of image quality labels to each set of pixels indicating the degree to which the independent cell is in focus. If the image quality labels corresponding to the sets of pixels indicate that the cells are out of focus, a focal length adjustment for adjusting focus of the microscopy device is determined using a trained machine learning model. Then, executable instructions are sent to the microscopy device to perform the focal length adjustment.

According to other embodiments, a system for performing adaptive focusing of a microscopy device comprises a microscopy device configured to acquire microscopy images depicting cells and one or more processors executing instructions for performing a method that includes extracting pixels from the microscopy images. Each set of pixels corresponds to an independent cell. A trained classifier is used to assign one of a plurality of image quality labels to each set of pixels indicating the degree to which the independent cell is in focus. If the image quality labels corresponding to the sets of pixels indicate that the cells are out of focus, a focal length adjustment for adjusting focus of the microscopy device is determined using a trained machine learning model. Then, executable instructions are sent to the microscopy device to perform the focal length adjustment.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures:

FIG. 7 shows an assessment of classification accuracy of the techniques described herein, according to one example implementation;

DETAILED DESCRIPTION

The following disclosure describes the present invention according to several embodiments directed at methods, systems, and apparatuses related to identifying the quality of the cell images acquired with digital holographic microscopy (DHM) or another type of microscopy device using convolutional neural networks (CNNs). More specifically, techniques are described herein for differentiation between "good quality" cell images where the cells are captured in focus and the "poor quality" images that are out of focus. In some embodiments, the problem is formulated as a binary image classification problem where the two classes are in-focus/out-of-focus. This problem is then solved using a CNN. As explained in further detail below, this general framework can be expanded upon with various enhancements, refinements, and other modifications in different embodiments of the present invention.

Figure 1:
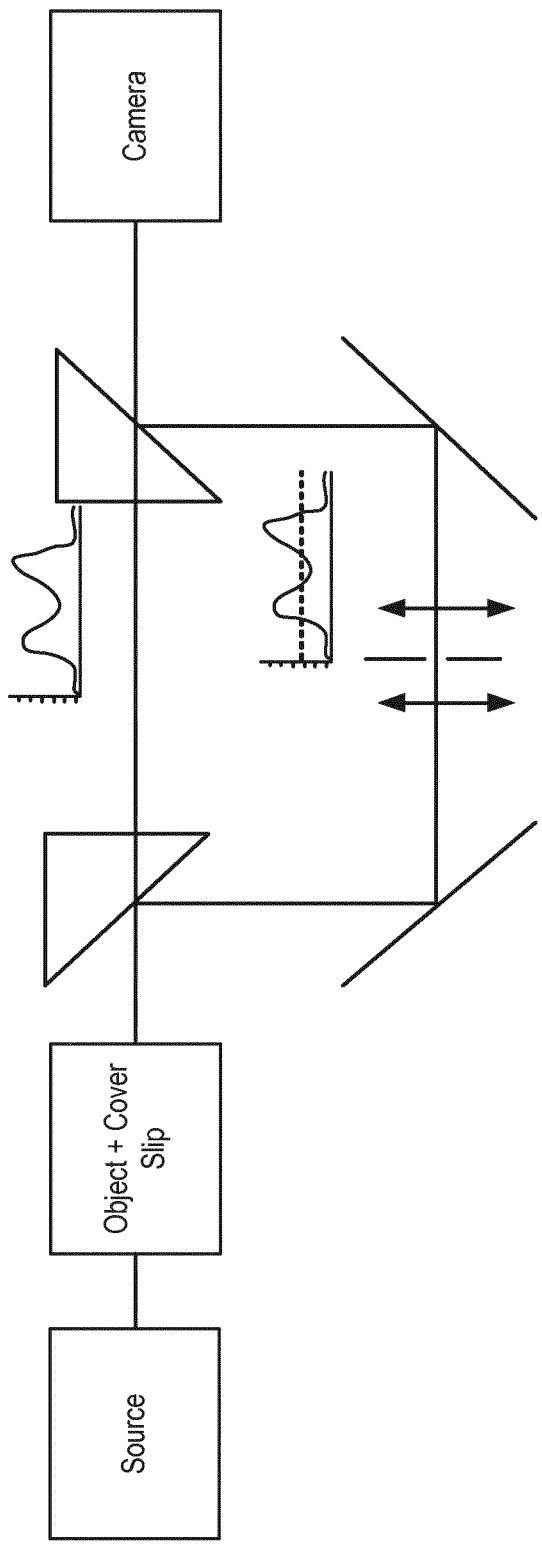
FIG. 1 shows an example DHM setup.
Figure 2:
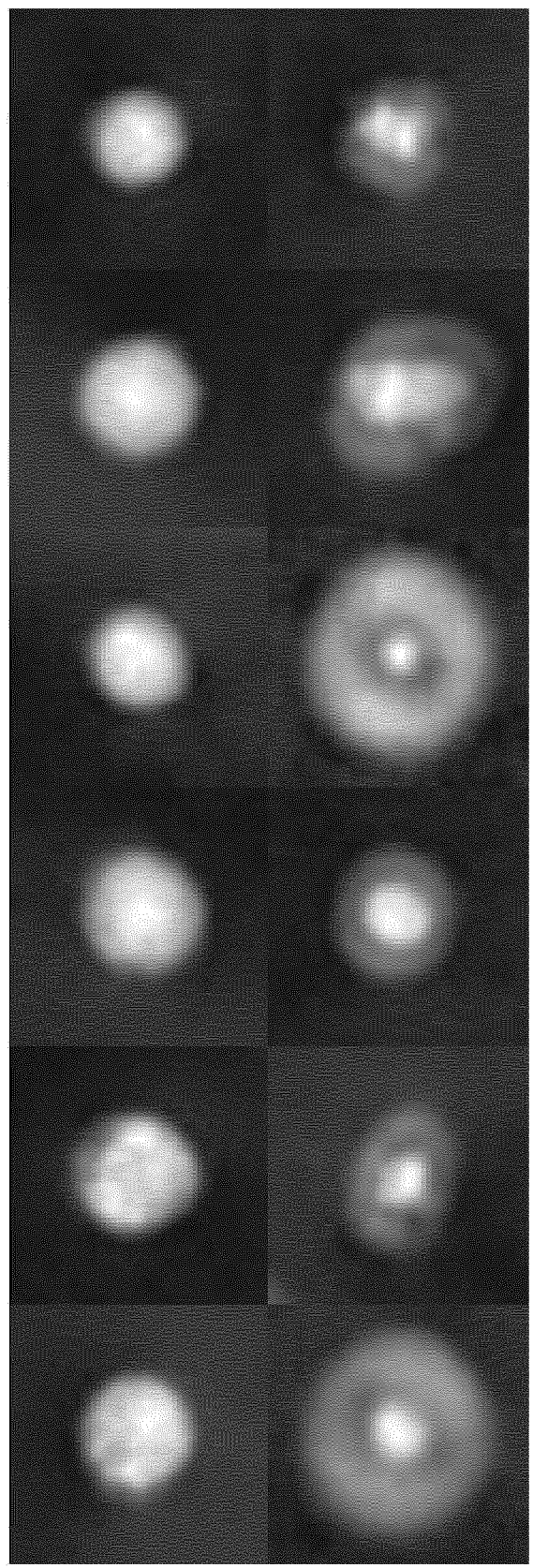
FIG. 2 illustrates example cell images with different quality.
Figure 3:
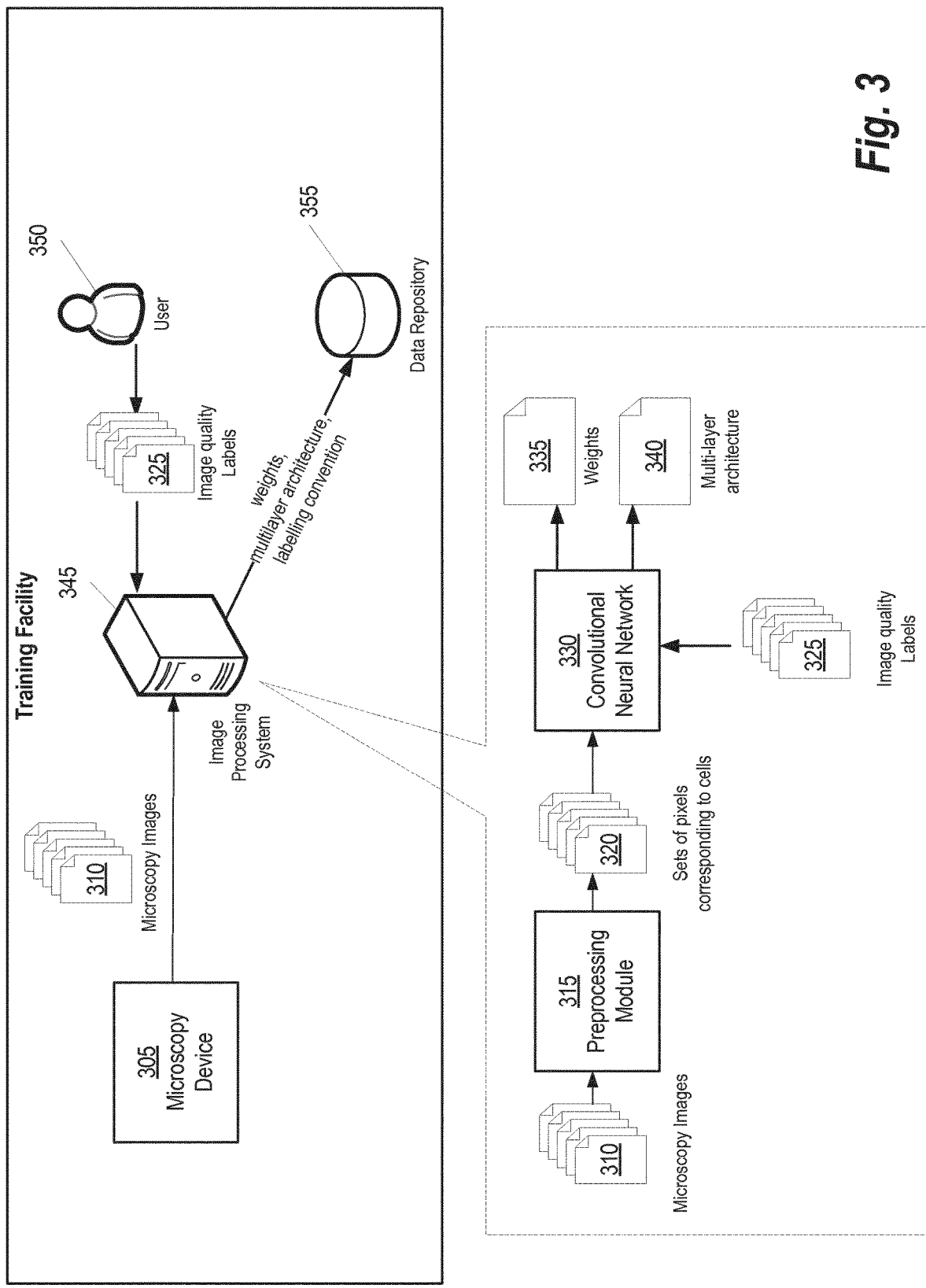
FIG. 3 shows the system diagram illustrating the actors and operations used to assess image quality, according to some embodiments.

FIG. 3 shows the system diagram illustrating the actors and operations used to assess image quality, according to some embodiments. Briefly, a Microscopy Device 305 is used to acquire one or more Microscopy Images 310. The Microscopy Device 305 may be any system known in the art capable of acquiring microscopy images of cells. For example, in some embodiments, the Microscopy Images 310 may be acquired using off-axis digital holographic microscope (DHM). The acquisition can alternatively be done using other DHM techniques such as on axis configurations. In other embodiments the Microscopy Device 305 uses other cell imaging techniques known in the art which can be used to acquire the Microscopy Images 310. Example alternative imaging techniques include, without limitation, bright field microscopy, dark field microscopy, differential interference contrast, fluorescence microscopy, confocal microscopy, two-photon excitation microscopy, and multiphoton microscopy.

Because the acquisition of the Microscopy Images 310 is a tedious procedure due to the need to prepare the blood samples, in some embodiments techniques such as Deep Convolutional General Adversarial Networks (DCGAN) may be used to generate synthetic data at different foci. As would be generally understood by one skilled in the art, generative models model the distribution of individual classes. Generative adversarial networks (GANs) generally represent a class of artificial intelligence algorithms that falls under the category of "unsupervised learning." In its simplest form, GANs are a combination of two neural networks: one network is learning how to generate examples (e.g., synthetic DHM images) from a training data set (e.g., images acquired using Microscopy Device 305), and another network attempts to distinguish between the generated examples and the training data set. The training process is successful if the generative network produces examples which converge with the actual data such that the discrimination network cannot consistently distinguish between the two.

Continuing with reference to FIG. 3, the Microscopy Images 310 are received by an Image Processing System 345 that has processing resources for training a CNN 330 based using the Microscopy Images 310. Before training the CNN 330, a Preprocessing Module 315 extracts the independent cells from the Microscopy Images 310 for training. Each cell is extracted as a Set of Pixels 320. For the purposes of this disclosure, each individual Set of Pixels 320 is also sometimes referred to as a "cell image." It should be noted that various types of image classification models can be used as an alternative to CNNs in other embodiments including, without limitation, linear classifiers (e.g., logistic regression, naïve bayes classifiers, etc.), kernel estimation k-means clustering, nearest neighbor classification, support vector machines, decision trees, boosted trees, random forests, and different configurations of neural networks.

Figure 4:
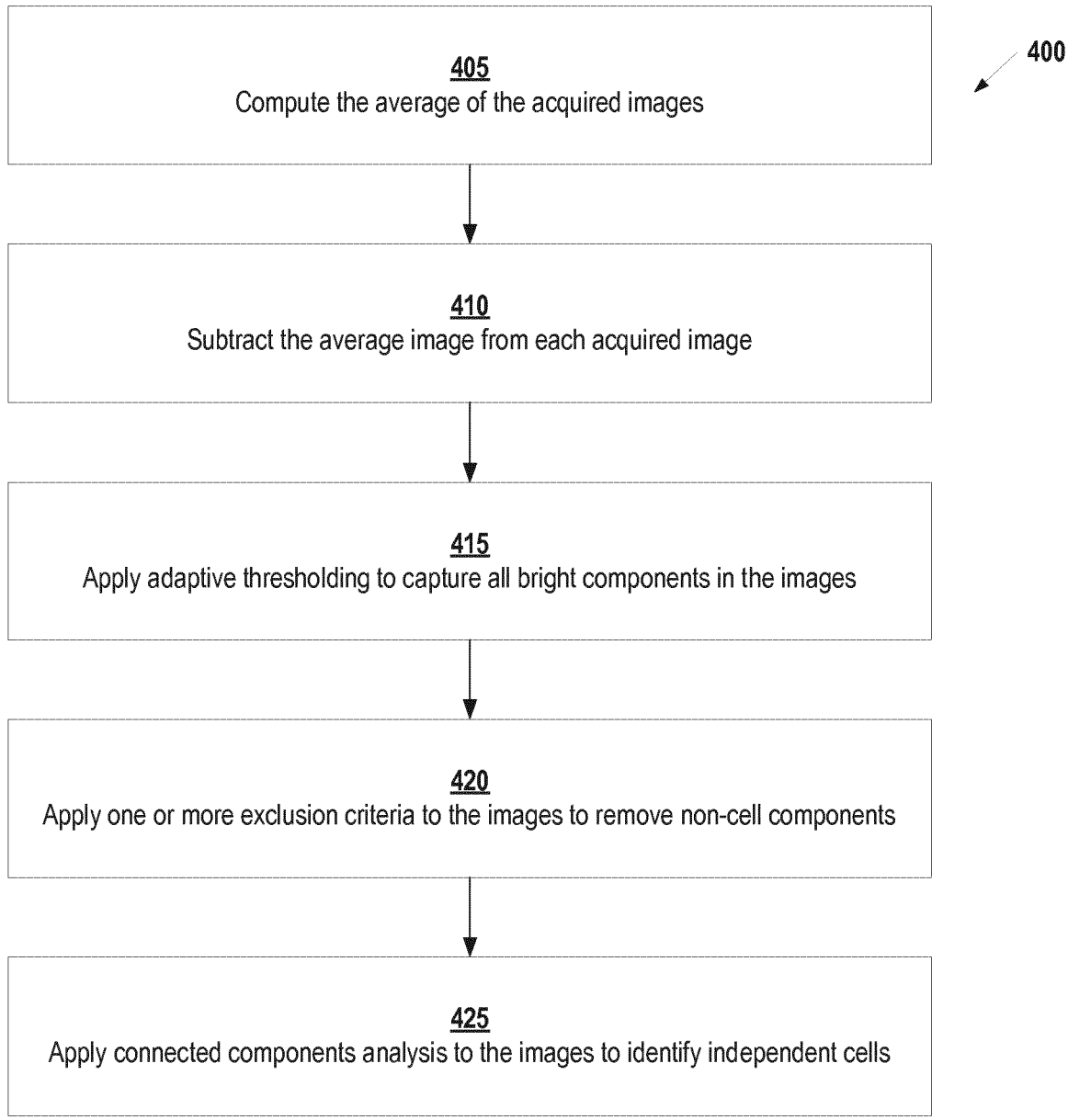
FIG. 4 illustrates a technique for extracting the cells, according to some embodiments.
Figure 5A:
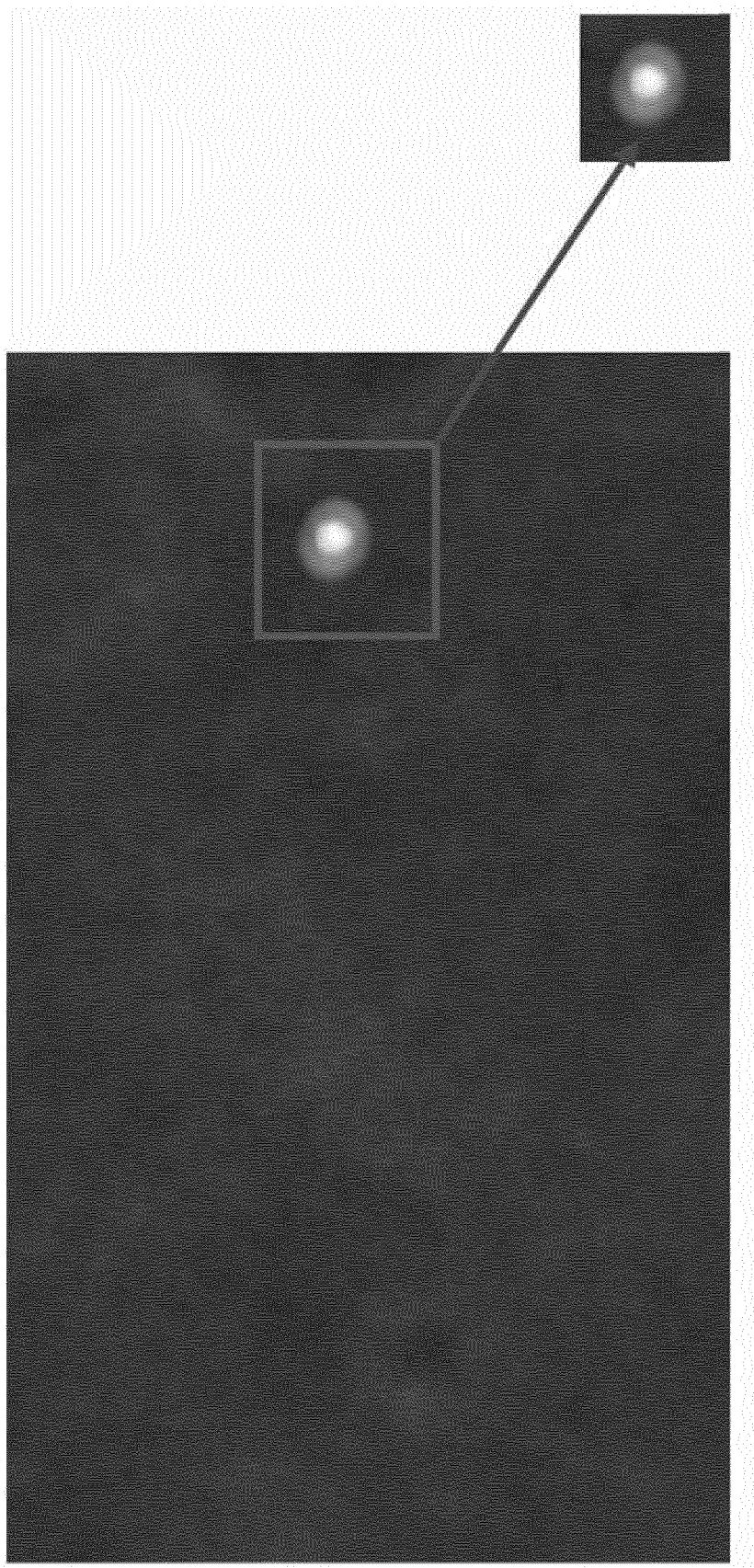
FIG. 5A illustrates a first example extraction of cells.
Figure 5B:
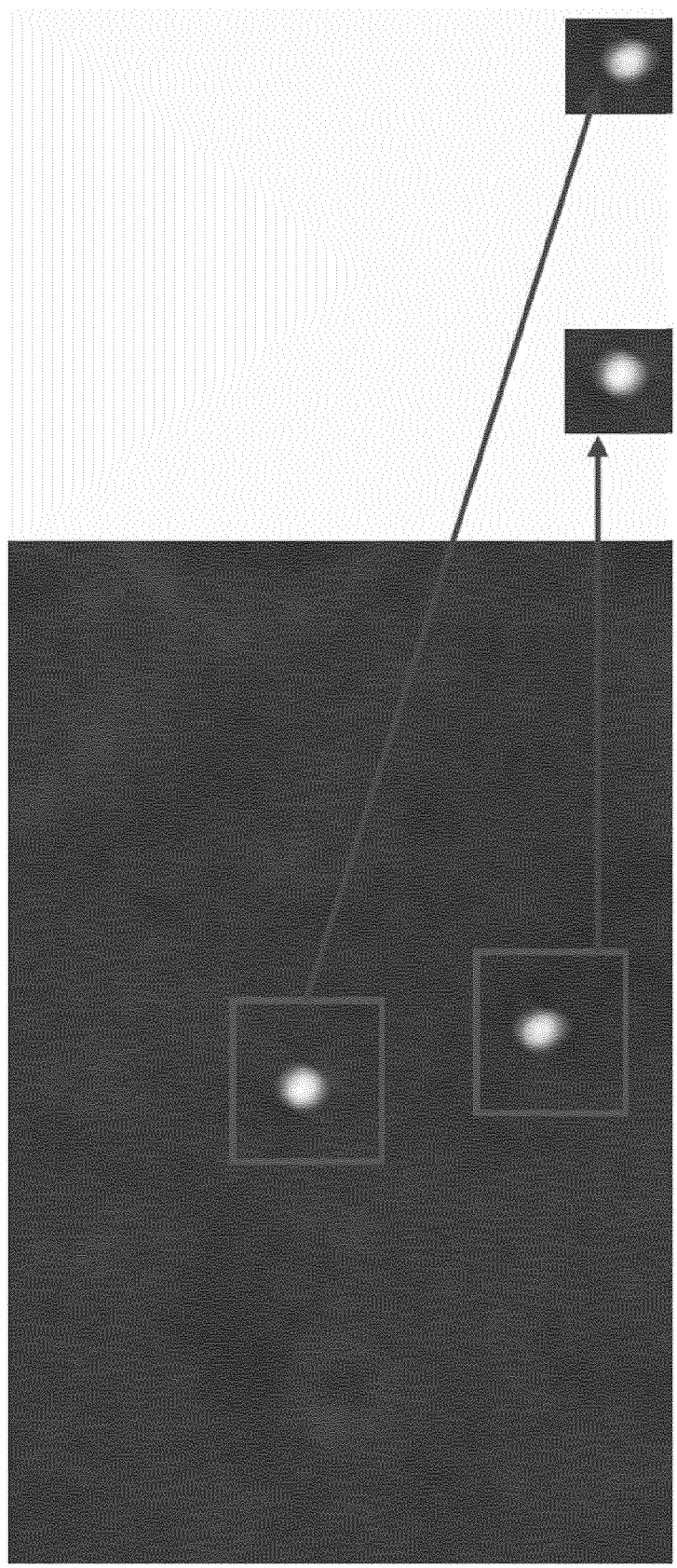
FIG. 5B illustrates a second example extraction of cells.

FIG. 3 shows the system diagram illustrating the actors and operations used to assess image quality, according to some embodiments. FIG. 4 illustrates a technique 400 for extracting the cells, according to some embodiments. For this example, assume that the acquired images have a dimension of 384×512 and 100 images are acquired per second. To perform background correction the average of the first 100 images is computed at step 405 and the average image is subtracted from each acquired image at step 410. Next, at step 415, adaptive thresholding is applied to capture all the bright components in the image. Various adaptive thresholding techniques generally known in the art may be applied at step 415. For example, in one embodiment, the intensity values of the local neighborhood of each pixel are used to determine a threshold for the pixel. If the pixel is below the threshold value, it is set to some minimum value (e.g., pure black). After thresholding, one or more exclusion criteria are applied to the images at step 420 to illuminate non-cell components. Examples of exclusion criteria that may be applied at step 420 include, without limitation, width, height, aspect ratio and circularity of the object. Once these components are eliminated, connected components analysis is applied at step 425 to identify the sets of pixels corresponding to independent cells. Each set of pixels is cropped using a predefined crop box of size 51×51. FIGS. 5A and 5B illustrate the extraction of the different cells.

In some embodiments, as an alternative to the techniques described above, the Preprocessing Module 315 can use detection techniques such as probabilistic boosting trees, deep convolutional neural networks to detect the location of the cell. Cell segmentation can also be used to extract the cell. This can be performed using energy minimization techniques such as graph cuts, watershed, random walker, or Mumford-Shah. It can also be performed using model based methods that would fit a predefined shape (e.g., a circle) to the desired object. Additionally, the segmentation can be performed with alternative techniques such as edge matching, gradient matching or intensity matching. Additional details on how segmentation may be performed are detailed in U.S. Patent Application Publication No. 2018/0144182A1 entitled "Analyzing digital holographic microscopy data for hematology applications," the entirety of which is incorporated herein by reference.

Continuing with reference to FIG. 3, the Image Processing System 345 uses the Sets of Pixels 320 to train the CNN 330 to solve the image classification problem. The classification problem aims at assigning a label for each image. In the example of FIG. 3, a User 350 manually inspects each Set of Pixels 320 corresponding to a cell to generate Image Quality Labels 325. For example, the User 350 may be provided with a graphical user interface (GUI) where each cell is presented and with an input field that allows specification of the Image Quality Labels 325. In other embodiments, the task of generating the Image Quality Labels 325 can be distributed over a plurality of users.

In some embodiments, the Image Quality Labels 325 are 0, for a cell image that is out of focus and 1, for a cell image that is in focus. In some embodiments, a wider range of labels are given for different focal plane images and this would capture a larger range of variation in the image. For example, in one embodiment the label can be a grade for the cell from 1 to 10 where cells with grade 1 are the worst and cells with grade 10 are the best. Correlation between these grades and the focal distance can be used to automatically adjust the focal plane or provide feedback to the device operator to perform such adjustment. Depending on the subsequent workflow, cells belonging to one or more of these grade classes can be included.

As is generally understood in the art, a CNN 330 includes an input layer, one or more hidden layers, and an output layer. The objective of training the CNN 330 is to learn a transfer function between the input layer (features that represent the image) and the output layer (the labels for the image). The Image Processing System 345 performs iterative forward and backward passes that are made through the CNN 330 as the transfer function is minimized with respect to Weights 335 connecting the different layers of the CNN architecture. Once the CNN 330 has been trained, a description of the Multi-layer Architecture 340 (i.e., the composition of the different layers) and the Weights 335 connecting the neurons from the different layers are stored in a Data Repository 355 along with description of the labelling system employed during training. The information in the Data Repository 355 can later be used to deploy the CNN 330. For example, in some embodiments, the NVIDIA TensorRT® is used to deploy the CNN 330 into a production environment. TensorRT requires 3 files to execute a CNN: a network architecture file, trained weights, and a label file to provide a name for each output class. These 3 files may be generated by the description of the Multi-Layer Architecture 340, Weights 335, and the description of the labelling system, respectively.

Figure 6A:
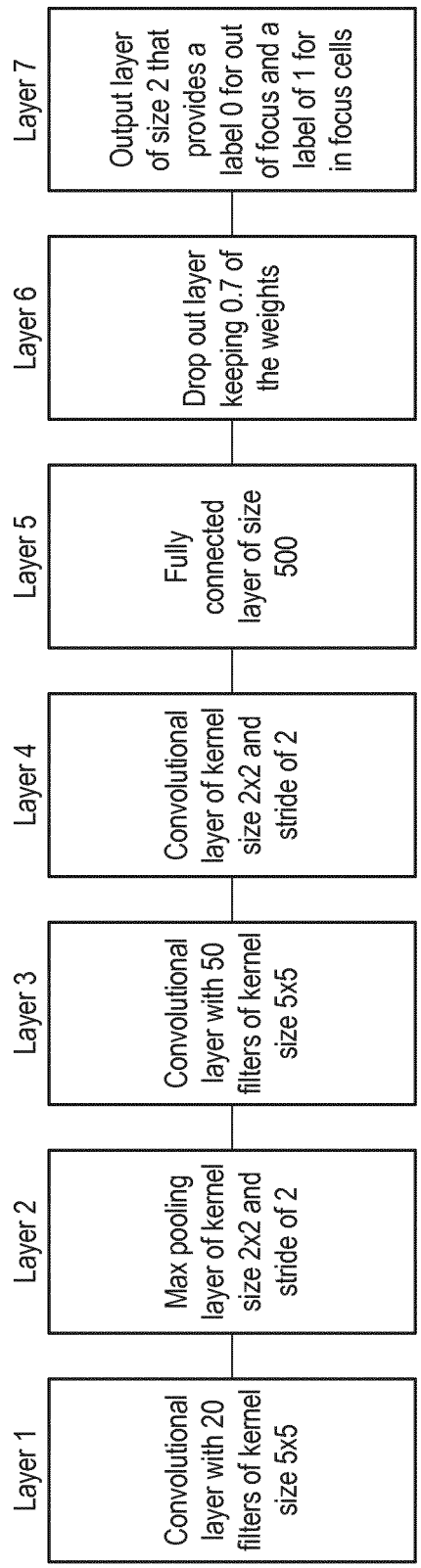
FIG. 6A illustrates an example of the multi-layer architecture that may be employed by the CNN, according to some embodiments.
Figure 6B:
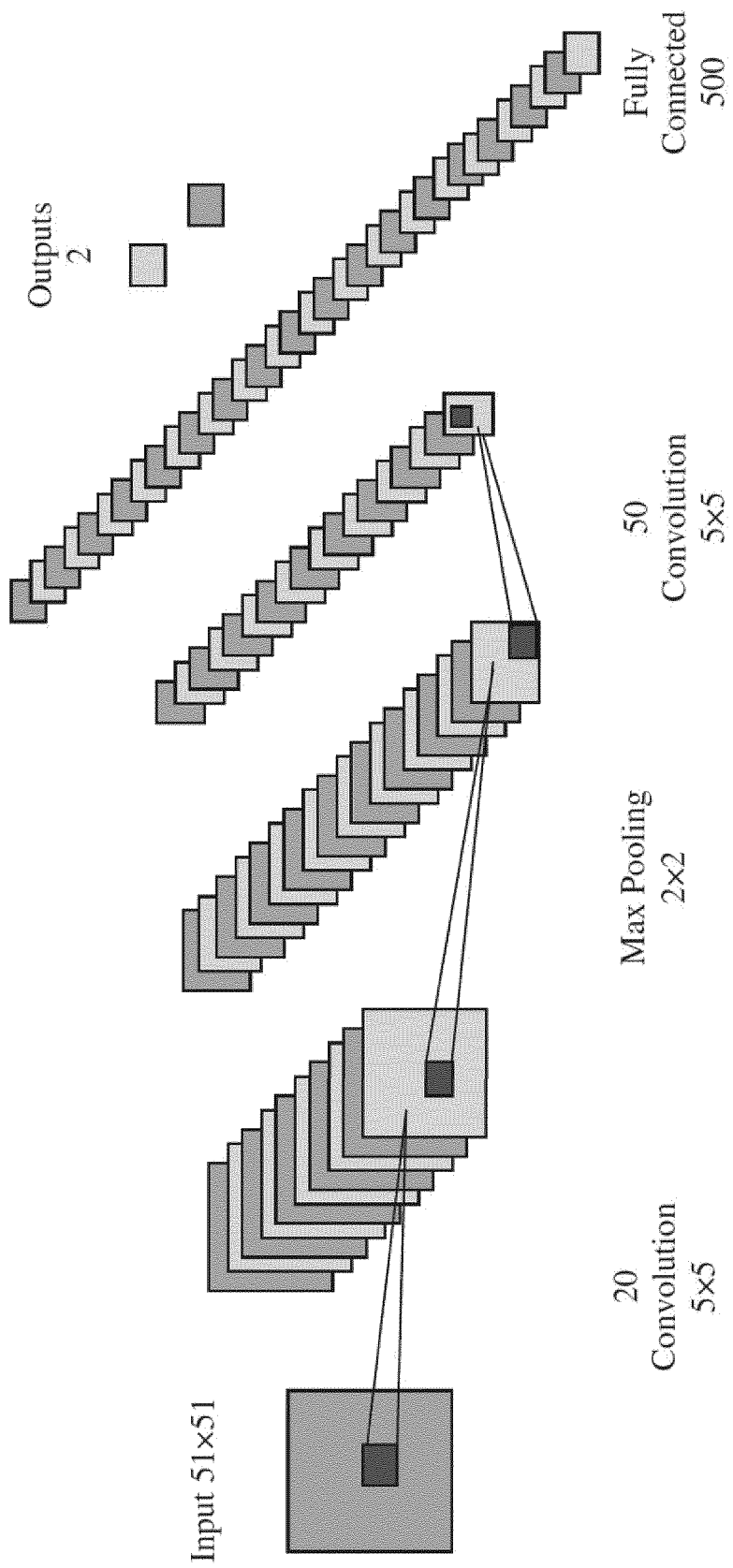
FIG. 6B provides an alternate view of the multi-layer architecture shown in FIG. 6A.

FIG. 6A illustrates an example of the Multi-Layer Architecture 340 that may be employed by the CNN 330, according to some embodiments. The first layer is convolutional layer with 20 filters of kernel size 5×5, while the second layer max pooling layer of kernel size 2×2 and stride of 2. The third layer is a convolutional layer with 50 filters of kernel size 5×5 and the fourth layer is a convolutional layer of kernel size 2×2 and stride of 2. The fifth layer is a fully connected layer of size 500. The sixth layer is a drop out layer keeping 0.7 of the weights. Finally, the seventh layer is an output layer of size 2 that provides a label 0 for out of focus cells, and a label of 1 for in focus cells. FIG. 6B provides a visualization of the operations performed by the Multi-Layer Architecture 340 described in FIG. 6A. It should be noted that the network architecture shown in FIGS. 6A and 6B is just an example of a possible architecture. However, in other embodiments, a different number of layers can be used, the kernel sizes of the filters can also be different and different sizes could be used for different layers. Additionally, the dropout layer can be eliminated, or alternatively, multiple dropout layers may be used and the drop out probabilities can vary from 0 to 1.

To illustrate, verify and validate the utility of the use of the CNN for cell classification, an example dataset of labelled microscopy images was divided into two subsets, a subset used for training and another subset for testing. The classification accuracy of this test is shown in FIG. 7.

Figure 8:
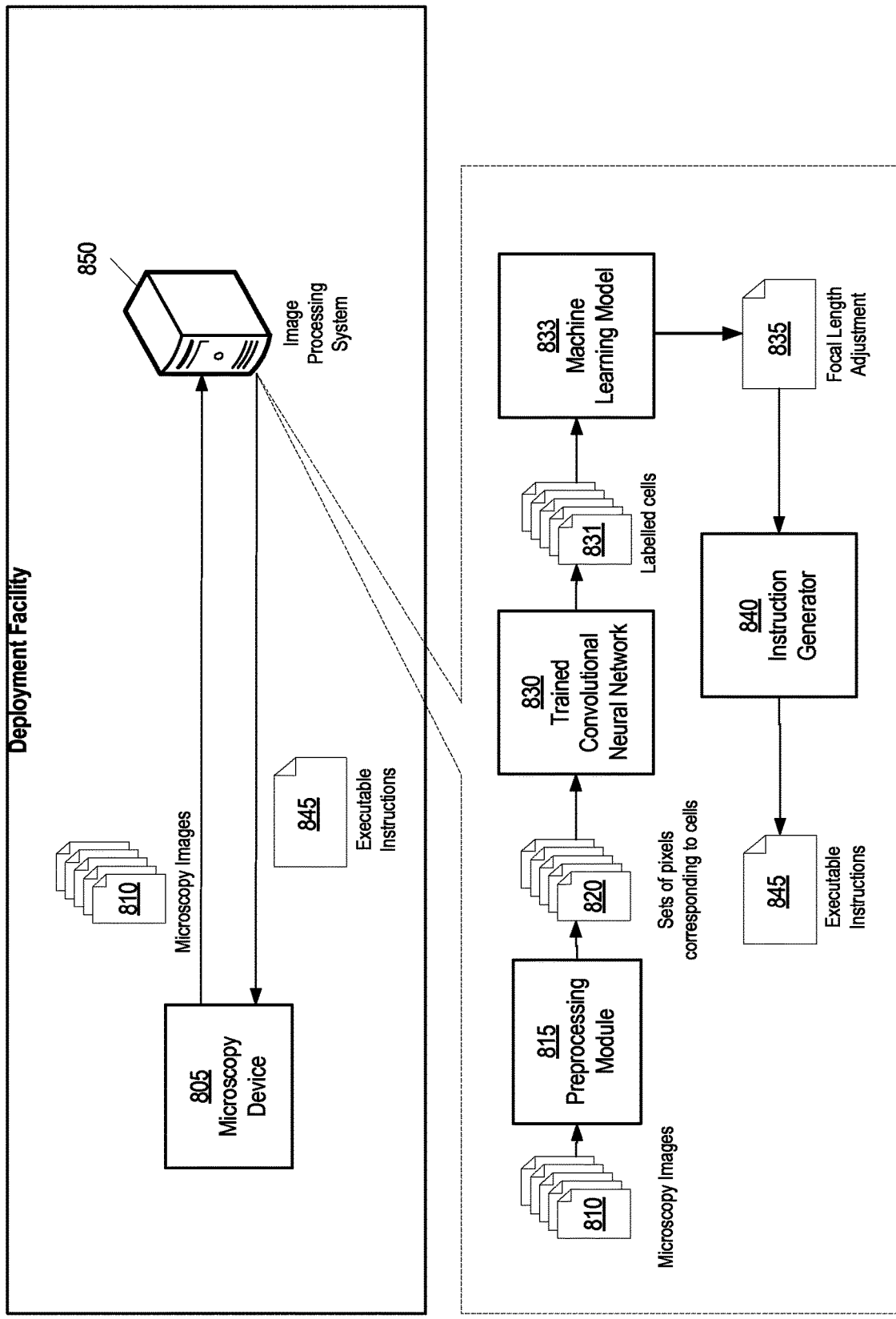
FIG. 8 provides an example deployment of a trained CNN, according to some embodiments.

In the deployment phase, the trained CNN is used to predict the output label based on the image features computed from the input image. FIG. 8 provides an example deployment, according to some embodiments. In this example, the output of the CNN is used to provide adaptive focusing of the microscope of the Microscopy Device 805. More specifically, the Microscopy Device 805 is used to acquire Microscopy Images 810 which are sent to an Image Processing System 850. At the Image Processing System 850, the Microscopy Images 810 are preprocessed by Preprocessing Module 815 to generate Sets of Pixels 820 corresponding to cells. The Preprocessing Module 815 shown in FIG. 8 operates in a manner similar to the Preprocessing Module 315 described above with respect to FIG. 3. The Sets of Pixels 820 are used as input to the Trained CNN 830 that, in turn, output Labelled Cells 831. That is, the output are the Sets of Pixels 820 with labels according to the labelling convention (e.g., 0 for out of focus or 1 for in focus).

The Labelled Cells 831 are used as input to a Machine Learning Model 833 trained to output a Focal Length Adjustment 835 for the Microscopy Device 805 to adjust any focus issues. This Machine Learning Model 833 trained by monitoring, over time, how the Microscopy Device 805 is adjusted in response to the acquired microscopy images and the output of the Trained CNN 830. Such monitoring may be performed, for example, by recording instructions sent to the Microscopy Device 805. Alternatively, an operator can manually enter the focal length changes into the Image Processing System 850. Using the monitored data, a manifold (i.e., a basis set) of well-focused images can be learned that provides the correlation between the focal length and the quality of the image. Example techniques that can be employed to learn the manifold include, without limitation, principal component analysis (PCA), locally-linear embedding, and diffusion maps.

The Machine Learning Model 833 outputs a Focal Length Adjustment 835 for the Microscopy Device 805. This Focal Length Adjustment 835 is then used as input to an Instruction Generator 840 that translates the adjustment into Executable Instructions 845 for the Microscopy Device 805. The implementation of the Instruction Generator 840 is dependent on the interface of the Microscopy Device 805. However, in general, the Instruction Generator 840 can be understood as software that provides an additional interface layer between the Image Processing System 850 and the Microscopy Device 805. In some embodiments, the Machine Learning Model 833 can be trained to directly output the Executable Instructions 845, thus obviating the need for the Instruction Generator 840.

Figure 9:
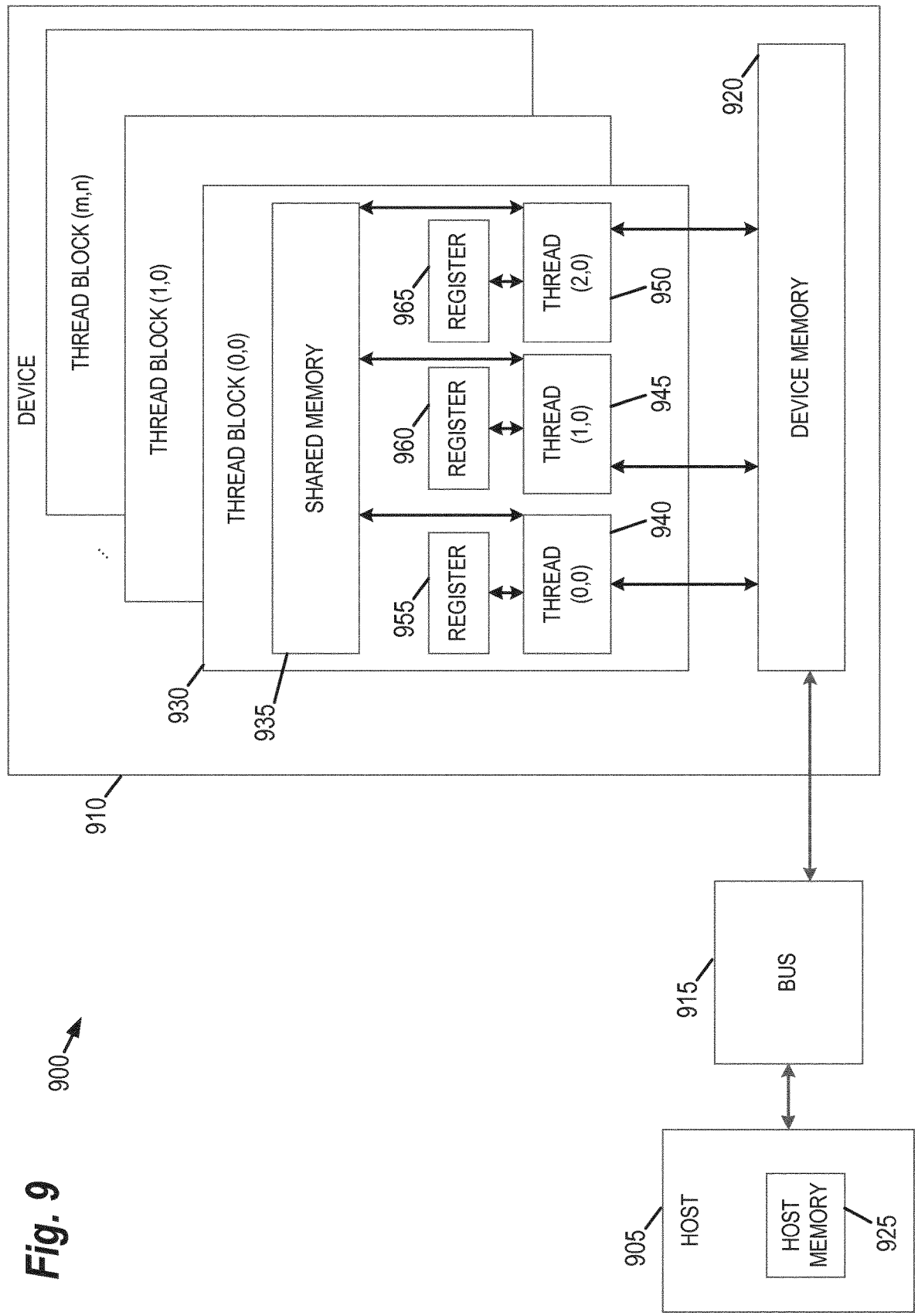
FIG. 9 provides an example of a parallel processing memory architecture that may be utilized by image processing system, according to some embodiments of the present invention.

FIG. 9 provides an example of a parallel processing memory architecture 900 that may be utilized by an image processing system, according to some embodiments of the present invention. This architecture 900 may be used in embodiments of the present invention where NVIDIA™ CUDA (or a similar parallel computing platform) is used. The architecture includes a host computing unit ("host") 905 and a GPU device ("device") 910 connected via a bus 915 (e.g., a PCIe bus). The host 905 includes the central processing unit, or "CPU" (not shown in FIG. 9) and host memory 925 accessible to the CPU. The device 910 includes the graphics processing unit (GPU) and its associated memory 920, referred to herein as device memory. The device memory 920 may include various types of memory, each optimized for different memory usages. For example, in some embodiments, the device memory includes global memory, constant memory, and texture memory.

Parallel portions of a CNN may be executed on the architecture 900 as "device kernels" or simply "kernels." A kernel comprises parameterized code configured to perform a particular function. The parallel computing platform is configured to execute these kernels in an optimal manner across the architecture 900 based on parameters, settings, and other selections provided by the user. Additionally, in some embodiments, the parallel computing platform may include additional functionality to allow for automatic processing of kernels in an optimal manner with minimal input provided by the user.

The processing required for each kernel is performed by grid of thread blocks (described in greater detail below). Using concurrent kernel execution, streams, and synchronization with lightweight events, the architecture 900 of FIG. 9 (or similar architectures) may be used to parallelize training of the CNN. For example, in some embodiments, processing of individual cell images may be performed in parallel.

The device 910 includes one or more thread blocks 930 which represent the computation unit of the device 910. The term thread block refers to a group of threads that can cooperate via shared memory and synchronize their execution to coordinate memory accesses. For example, in FIG. 9, threads 940, 945 and 950 operate in thread block 930 and access shared memory 935. Depending on the parallel computing platform used, thread blocks may be organized in a grid structure. A computation or series of computations may then be mapped onto this grid. For example, in embodiments utilizing CUDA, computations may be mapped on one-, two-, or three-dimensional grids. Each grid contains multiple thread blocks, and each thread block contains multiple threads. For example, in FIG. 9, the thread blocks 930 are organized in a two dimensional grid structure with m+1 rows and n+1 columns. Generally, threads in different thread blocks of the same grid cannot communicate or synchronize with each other. However, thread blocks in the same grid can run on the same multiprocessor within the GPU at the same time. The number of threads in each thread block may be limited by hardware or software constraints. In some embodiments, processing of subsets of the training data or operations performed by the algorithms discussed herein may be partitioned over thread blocks automatically by the parallel computing platform software. However, in other embodiments, the individual thread blocks can be selected and configured to optimize training of the CNN. For example, in one embodiment, each thread block is assigned an individual cell image or group of related cell images.

Continuing with reference to FIG. 9, registers 955, 960, and 965 represent the fast memory available to thread block 930. Each register is only accessible by a single thread. Thus, for example, register 955 may only be accessed by thread 940. Conversely, shared memory is allocated per thread block, so all threads in the block have access to the same shared memory. Thus, shared memory 935 is designed to be accessed, in parallel, by each thread 940, 945, and 950 in thread block 930. Threads can access data in shared memory 935 loaded from device memory 920 by other threads within the same thread block (e.g., thread block 930). The device memory 920 is accessed by all blocks of the grid and may be implemented using, for example, Dynamic Random-Access Memory (DRAM).

Each thread can have one or more levels of memory access. For example, in the architecture 900 of FIG. 9, each thread may have three levels of memory access. First, each thread 940, 945, 950, can read and write to its corresponding registers 955, 960, and 965. Registers provide the fastest memory access to threads because there are no synchronization issues and the register is generally located close to a multiprocessor executing the thread. Second, each thread 940, 945, 950 in thread block 930, may read and write data to the shared memory 935 corresponding to that block 930. Generally, the time required for a thread to access shared memory exceeds that of register access due to the need to synchronize access among all the threads in the thread block. However, like the registers in the thread block, the shared memory is typically located close to the multiprocessor executing the threads. The third level of memory access allows all threads on the device 910 to read and/or write to the device memory. Device memory requires the longest time to access because access must be synchronized across the thread blocks operating on the device. Thus, in some embodiments, the processing of each cell image is coded such that it primarily utilizes registers and shared memory and only utilizes device memory as necessary to move data in and out of a thread block.

The embodiments of the present disclosure may be implemented with any combination of hardware and software. For example, aside from parallel processing architecture presented in FIG. 9, standard computing platforms (e.g., servers, desktop computer, etc.) may be specially configured to perform the techniques discussed herein. In addition, the embodiments of the present disclosure may be included in an article of manufacture (e.g., one or more computer program products) having, for example, computer-readable, non-transitory media. The media may have embodied therein computer readable program code for providing and facilitating the mechanisms of the embodiments of the present disclosure. The article of manufacture can be included as part of a computer system or sold separately.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

A graphical user interface (GUI), as used herein, comprises one or more display images, generated by a display processor and enabling user interaction with a processor or other device and associated data acquisition and processing functions. The GUI also includes an executable procedure or executable application. The executable procedure or executable application conditions the display processor to generate signals representing the GUI display images. These signals are supplied to a display device which displays the image for viewing by the user. The processor, under control of an executable procedure or executable application, manipulates the GUI display images in response to signals received from the input devices. In this way, the user may interact with the display image using the input devices, enabling user interaction with the processor or other device.

As used herein, the term "module" can refer to either or both of: (i) a software component that causes an electronic device to accept various inputs and generate certain outputs; or (ii) an electronic input/output interface, such as a panel, frame, textbox, window or other portion of a GUI.

The functions and process steps herein may be performed automatically or wholly or partially in response to user command. An activity (including a step) performed automatically is performed in response to one or more executable instructions or device operation without user direct initiation of the activity.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers and processes can be implemented using hardware components, software components, and/or combinations thereof. No claim element herein is to be construed under the provisions of 35 U.S.C. 112(f) unless the element is expressly recited using the phrase "means for."

The invention claimed is:

1. A computer-implemented method for performing adaptive focusing of a microscopy device (305), the method comprising:

acquiring a plurality of microscopy images (310) depicting cells using a microscopy device (305);

extracting one or more sets of pixels (320) from the plurality of microscopy images (310), wherein each set of pixels (320) corresponds to an independent cell;

using a trained classifier to assign one of a plurality of image quality labels (325) to each set of pixels (320) indicating the degree to which the independent cell is in focus;

if the image quality labels (325) corresponding to the sets of pixels (320) indicate that the cells are out of focus, determining a focal length adjustment (835) for adjusting focus of the microscopy device (305) using a trained machine learning model (833); and sending executable instructions (845) to the microscopy device (305) to perform the focal length adjustment (835).

2. The method of claim 1, wherein the machine learning model (833) is trained using (i) a set of training images, (ii) labels of focus quality, and (iii) an indication of focal length used in acquiring each training image.

3. The method of claim 1, wherein the trained classifier is a convolutional neural network.

4. The method of claim 1, wherein the microscopy device (305) is a DHM device (910).

5. The method of claim 1, wherein the plurality of image quality labels (325) consist of two values indicating an in-focus image or an out-of-focus image, respectively.

6. The method of claim 1, wherein the plurality of image quality labels (325) consist of range of more than two values between a minimum value indicating poorest image quality and a maximum value indicating best image quality.

7. A system for performing adaptive focusing of a microscopy device (305), the system comprising:

a microscopy device (305) configured to acquire a plurality of microscopy images (310) depicting cells; and one or more processors executing instructions for performing a method comprising:

extracting one or more sets of pixels (320) from the plurality of microscopy images (310), wherein each set of pixels (320) corresponds to an independent cell;

using a trained classifier to assign one of a plurality of image quality labels (325) to each set of pixels (320) indicating the degree to which the independent cell is in focus;

if the image quality labels (325) corresponding to the sets of pixels (320) indicate that the cells are out of focus, determining a focal length adjustment (835) for adjusting focus of the microscopy device (305) using a trained machine learning model (833); and sending executable instructions (845) to the microscopy device (305) to perform the focal length adjustment (835).

8. The system of claim 7, wherein the one or more processors are included in a parallel processing platform that parallelize operations associated with use of the trained classifier.

9. The system of claim 8, wherein the one or more processors apply the trained classifier to multiple sets of pixels (320) in parallel.

* * * * *